US010534184B2

(12) United States Patent
Gupta

(10) Patent No.: US 10,534,184 B2
(45) Date of Patent: Jan. 14, 2020

(54) AUXILIARY DEVICE FOR HEAD-MOUNTED DISPLAYS

(71) Applicant: Amitabha Gupta, Toronto (CA)

(72) Inventor: Amitabha Gupta, Toronto (CA)

(73) Assignee: GUPTA, Amitabha, Toronto, Ontario (CA)

(*) Notice: Subject to any disclaimer, the term of this patent is extended or adjusted under 35 U.S.C. 154(b) by 228 days.

(21) Appl. No.: 15/389,672

(22) Filed: Dec. 23, 2016

(65) Prior Publication Data
US 2018/0180893 A1 Jun. 28, 2018

(51) Int. Cl.
G02B 27/01 (2006.01)
H04N 7/18 (2006.01)
G02C 11/00 (2006.01)

(52) U.S. Cl.
CPC ......... G02B 27/0176 (2013.01); H04N 7/183 (2013.01); G02B 2027/0132 (2013.01); G02B 2027/0138 (2013.01); G02B 2027/0178 (2013.01); G02C 11/10 (2013.01)

(58) Field of Classification Search
None
See application file for complete search history.

(56) References Cited

U.S. PATENT DOCUMENTS

| 4,810,080 | A | 3/1989 | Grendol et al. |
| 5,428,407 | A | 6/1995 | Sheffield |
| 5,790,230 | A | 8/1998 | Sved |
| 5,929,963 | A | 7/1999 | McNeal |
| 7,641,333 | B2 | 1/2010 | Blanshay et al. |
| 2005/0099592 | A1* | 5/2005 | Lee ........................ G02C 9/00 351/134 |
| 2009/0073376 | A1* | 3/2009 | Swift ..................... G02C 7/086 351/59 |
| 2009/0213038 | A1 | 8/2009 | Huang et al. |
| 2011/0012814 | A1 | 1/2011 | Tanaka |
| 2011/0083256 | A1 | 4/2011 | Wang-Lee |
| 2011/0109871 | A1 | 5/2011 | Chiou |
| 2011/0234584 | A1* | 9/2011 | Endo .................... G02B 27/017 345/419 |
| 2014/0063437 | A1* | 3/2014 | Cater ..................... A61F 9/028 351/62 |

OTHER PUBLICATIONS

"Optics3D" [http://www.optics3d.co.uk/] retrieved Sep. 18, 2018.*
"Rochester Optical HoloLens Frame Insert" (Hereafter, "HoloLens") [http://rochesteroptical.com/store/hololensinsert/].*
Rochester Optical HoloLens Frame Insert (http://rochesteroptical.com/store/hololensinsert/), retrieved Oct. 19, 2016.

* cited by examiner

Primary Examiner — Kaitlin A Retallick
(74) Attorney, Agent, or Firm — Rowand LLP

(57) ABSTRACT

An auxiliary device for use with a head-mounted display (HMD) is disclosed. The auxiliary device includes a base plate configured to be detachably affixed to an interior surface of a front-facing panel of an HMD; a pair of nose pad arms extending from a first side of the base plate, each nose pad arm having a proximal end connected to the base plate and a distal end carrying a nose pad; and a lens holder frame extending from the first side of the base plate, the lens holder frame being configured to hold a first prescription lens and a second prescription lens in general alignment with a first display and a second display, respectively, of the HMD.

11 Claims, 5 Drawing Sheets

AUXILIARY DEVICE FOR HEAD-MOUNTED DISPLAYS

TECHNICAL FIELD

The present disclosure relates to head-mounted display devices and, in particular, to auxiliary devices for use with head-mounted displays.

BACKGROUND

Head-mounted display (HMD) devices are widely used in virtual and augmented reality applications. For example, virtual reality headsets have been used as wearable aids to assist those living with low vision or other vision impairments and disabilities. As HMD's may sometimes be used for long stretches of time, it would be useful to provide accessories or auxiliary devices that facilitate comfortable and effective use of HMD's.

BRIEF DESCRIPTION OF DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

In one aspect, the present disclosure describes an auxiliary device configured to be attached to a head-mounted display (HMD) that includes a housing having at least a front-facing panel, a first display, and a second display, the first and second displays being disposed in spaced relation to each other on an interior surface of the front-facing panel and positioned to respectively cover a user's left and right eyes when the HMD is worn by the user. The auxiliary device includes: a base plate configured to be detachably affixed to the interior surface of the front-facing panel at a position that is between the first display and the second display; a pair of nose pad arms extending from a first side of the base plate, each nose pad arm having a proximal end connected to the base plate and a distal end carrying a nose pad; and a lens holder frame extending from the first side of the base plate, the lens holder frame being configured to hold a first prescription lens and a second prescription lens in spaced relation to the base plate such that the first prescription lens and the second prescription lens are held generally aligned with the first display and the second display, respectively, when the base plate is affixed to the interior surface of the front-facing panel.

In another aspect, the present disclosure describes a head-mounted display (HMD). The HMD includes a housing comprising a front-facing panel, a first display, and a second display, the first and second displays being disposed in spaced relation to each other on an interior surface of the front-facing panel and positioned to respectively cover a user's left and right eyes when the HMD is worn by the user. The HMD also includes an auxiliary device coupled to the housing. The auxiliary device includes: a base plate configured to be affixed to the interior surface of the front-facing panel at a position that is between the first display and the second display; a pair of nose pad arms extending from a first side of the base plate, each nose pad arm having a proximal end connected to the base plate and a distal end carrying a nose pad; and a lens holder frame extending from the first side of the base plate, the lens holder frame being configured to hold a first prescription lens and a second prescription lens in spaced relation to the base plate such that the first prescription lens and the second prescription lens are held generally aligned with the first display and the second display, respectively, when the base plate is affixed to the interior surface of the front-facing panel.

Other example embodiments of the present disclosure will be apparent to those of ordinary skill in the art from a review of the following detailed descriptions in conjunction with the drawings.

Figure 1A:
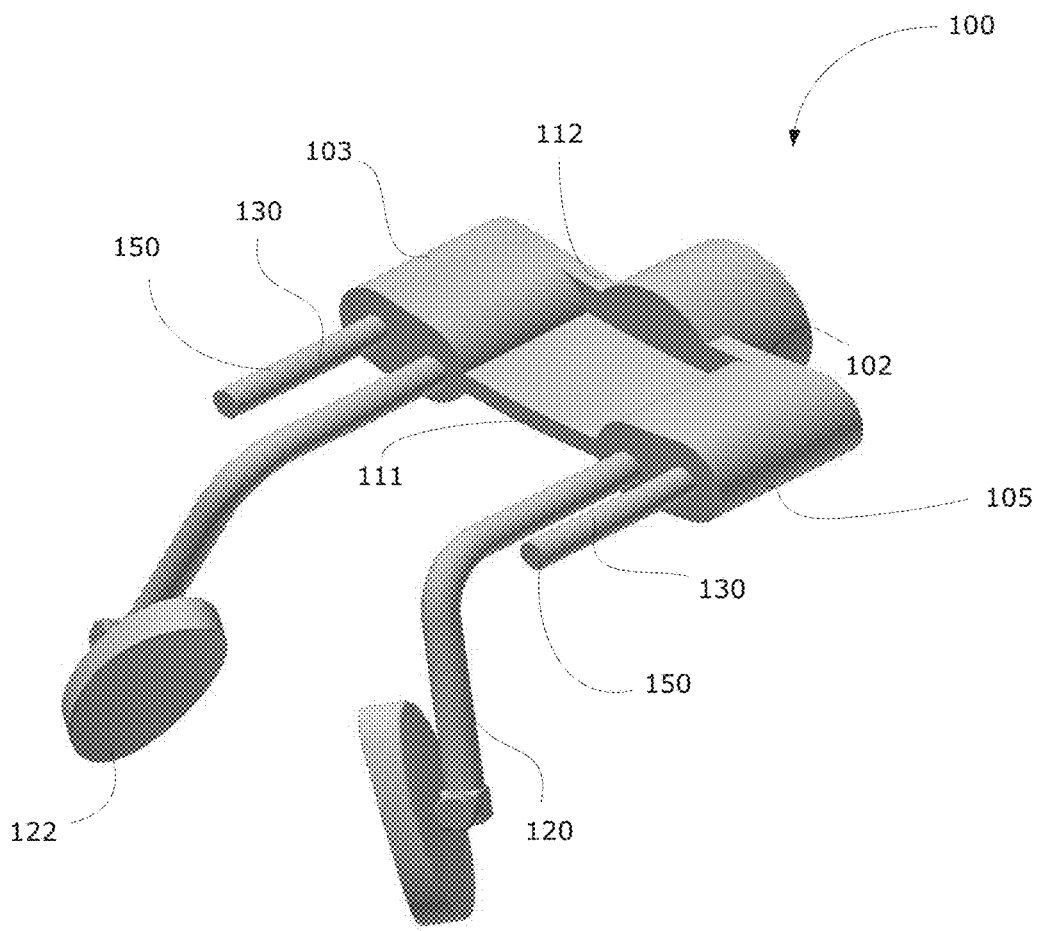
FIGS. 1A and 1B show perspective views of example auxiliary devices for head-mounted displays, in accordance with example embodiments of the present disclosure.

Reference is first made to FIG. 1A, which shows a perspective view of an example auxiliary device 100 for a head-mounted display (HMD). The auxiliary device 100 can be used in conjunction with various different types of HMD's and eyewear. For example, the auxiliary device 100 may be suitable for use with virtual reality (VR) or augmented reality (AR) goggles and/or glasses, low vision aid devices (e.g. electronic magnifiers), as well as protective eyewear such as ski masks or safety glasses. More specifically, the auxiliary device 100 is configured to be detachably affixed to the interior of an HMD and/or eyewear that is worn by a user. That is, the auxiliary device 100 is configured to be positioned on a side of an HMD or eyewear that is faced towards a user's face (i.e. located directly in front of the user's face) when the HMD or eyewear is worn by the user. The auxiliary device 100 may be used to, among others, facilitate proper positioning of an HMD/eyewear with respect to a user's face, promote comfortable use of an HMD/eyewear, and accommodate concurrent use of an HMD with prescription lenses or glasses. The auxiliary device 100 may be a stand-alone device that is configured to be connected to an HMD/eyewear, or it may be an integrated or built-in component of an HMD/eyewear.

The auxiliary device 100 includes a base plate 102. In at least some embodiments, the base plate 102 is elongate and generally planar. The base plate 102 has a first side 111 and a second side 112 opposite the first side 111. The first side 111 includes one or more components that are designed to engage with a user's face (e.g. nose pad arms 120) or to facilitate use of prescription lenses with an HMD (e.g. lens holder frame 130). The second side 112 may include a means for coupling the base plate 102 to an interior surface of an HMD (i.e. the surface of the HMD that is proximal to the user's face). In particular, when the auxiliary device 100 is affixed to an interior surface of an HMD worn by a user, the first side 111 is faced towards and positioned directly in front of the user's face and the second side 112 is adjacent to the interior surface of the HMD.

The auxiliary device 100 includes a pair of nose pad arms 120. The nose pad arms 120 extend from the first side 111 of the base plate 102 and support a pair of nose pads 122. In particular, each nose pad arm 120 has a proximal end that is connected to the base plate 102 and a distal end that carries a nose pad 122. The nose pads 122 may be formed of elastic and resilient material, such as silicone. The nose pad arms 120 may be flexible and each nose pad 122 may be coupled (either movably or otherwise) to its corresponding nose pad arm 120 at an angle, allowing for the adjusting of nose pad positions and proper engagement with a wearer's nose. For example, the nose pad arms 120 may be bent or bendable to adapt to the contour of a wearer's nose and/or face.

The nose pad arms 120 may extend from the first side 111 of the base plate 102 in spaced relation to each other. For example, the nose pad arms 120 may extend perpendicularly from the first side 111 of the base plate 102, and remain generally parallel to each other. In at least some embodiments, a first one of the nose pad arms 120 may be positioned proximal to a first end 103 of the base plate 102 and the other one of the nose pad arms 120 may be positioned proximal to a second end 105 of the base plate 102. The nose pad arms 120 may each have an angled portion near its distal end such that the corresponding nose pad 122 may be brought close to a user's nose when the auxiliary device 100 is used in conjunction with an HMD. For example, each nose pad arm 120 may comprise a first section which extends generally perpendicular to the base plate 102 and an adjacent second section which is angled in a downward direction relative to the first section.

The auxiliary device 100 also includes a lens holder frame 130 which extends from the first side 111 of the base plate 102. The lens holder frame 130 is configured to hold a pair of prescription lenses in spaced relation to the base plate 102. As shown in FIG. 1A, in at least some embodiments, the lens holder frame 130 may comprise a pair of generally parallel projections 150 that extend from the first side 111 of the base plate 102. A first one of the projections 150 may be positioned proximal to the first end 103 of the base plate 102 and the other one of the projections 150 may be positioned proximal to the second end 105 of the base plate 102.

The projections 150 are each configured to fixedly engage a respective prescription lens and hold the lenses in place with respect to a wearer's eyes and the displays of an HMD to which the auxiliary device 100 is attached. As shown in FIG. 1A, the projections 150 may be generally cylindrical, and each projection 150 may be configured to fixedly engage a prescription lens. For example, a prescription lens may have defined thereon a cylindrical bore or cavity, or the prescription lens may be at least partially retained in a lens frame which has a means for attaching to the cylindrical projection 150 (e.g., a bore or cavity defined in the lens frame). The projections 150 may be sized to matingly engage such bores or cavities such that the prescription lenses are maintained in fixed position relative to the projections 150 (e.g., via a friction fit). Other mechanisms, such as magnets and hook clips that are affixed to a prescription lens, may be used to fixedly attach a prescription lens to a projection 150.

In some embodiments, the projections 150 are positioned closer to the ends of the base plate 102 than the corresponding nose pad arms 120. For example, the first projection is positioned closer to the first end 103 of the base plate 102 than the first nose pad arm and the second projection is positioned closer to the second end 105 of the base plate 102 than the second nose pad arm. That is, the projections 150 are separated by a distance that is greater than the distance between the positions of the nose pad arms 120 on the base plate 102.

Figure 1B:
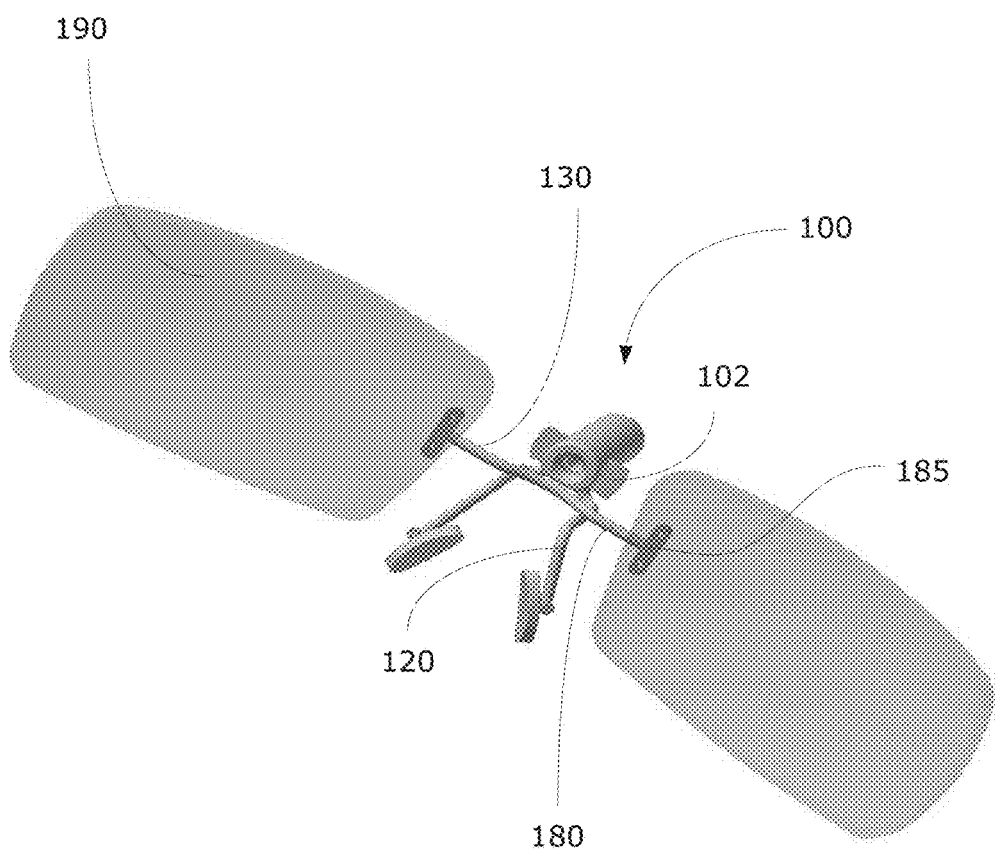

FIG. 1B shows a perspective view of another example auxiliary device 100. In FIG. 1B, the lens holder frame 130 comprises a pair of lens holder arms 180 extending laterally in opposite directions, away from each respective nose pad arm 120. Each lens holder arm 180 is configured to retain a prescription lens 190 such that a prescription lens 190 is disposed in front of each of a user's eyes when the auxiliary device 100 is in use with an HMD. In particular, for each of the pair of lens holder arms 180, a proximal end of a prescription lens 190 may be affixed (e.g. by gluing or using screws) or removably secured (e.g. attached as a clip-on) to the lens holder arm 180. Specifically, each lens holder arm 180 may include an end piece 185 which attaches to the body of a prescription lens 190. In some embodiments, the lens holder frame 130 may comprise a bar disposed in substantially parallel spaced relation to the base plate 102 and extending generally perpendicular to the nose pad arms 120. The lens holder frame 130 is configured to hold the prescription lenses 190 in spaced relation to display interfaces (e.g. display screens) of an HMD when the auxiliary device 100 is secured to the interior of the HMD. The lens holder frame 130 is also configured to hold the prescription lenses 190 a comfortable distance away from a user's eyes when the auxiliary device 100 is used with an HMD.

Figure 2:
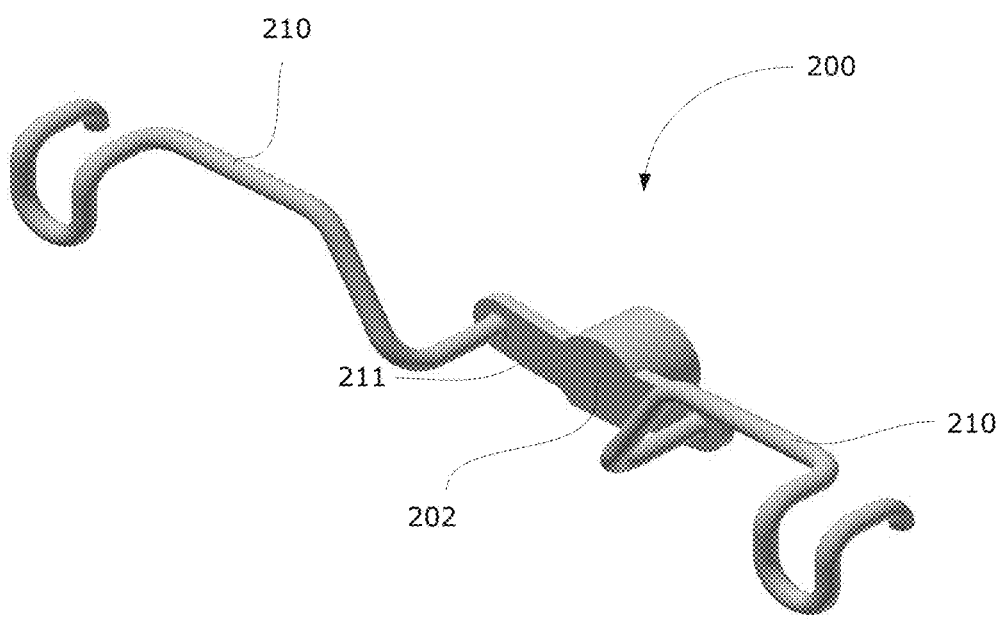
FIG. 2 is a perspective view of another example auxiliary device for a head-mounted display, in accordance with example embodiments of the present disclosure.

Reference is now made to FIG. 2, which shows another example auxiliary device 200 that is configured for attaching to an HMD during use of the HMD. The auxiliary device 200 includes a base plate 202 and a pair of retaining clips 210 extending from a first side 211 of the base plate 202. When the auxiliary device 200 is attached to an HMD, the retaining clips 210 may be used to secure a wearer's eyeglasses or spectacles to the HMD. For example, the retaining clips 210 may be sized to receive and retain portions of an eyeglasses frame such that the HMD can be secured to the eyeglasses via use of the auxiliary device 200. In this way, the eyeglasses can be worn in conjunction with an HMD (which may, for example, be worn over the eyeglasses).

In at least some embodiments, the retaining clips 210 extend laterally from the base plate 202 in opposite directions. For example, each retaining clip 210 may comprise an arm that initially extends perpendicularly from the first side 211 of the base plate 202 at a position that is proximal to one end of the base plate 202, and that gradually extends laterally away from the other end of the base plate 102. The retaining clips 210 may, in some cases, be spring clips. In some embodiments, a retaining clip 210 may have one or more flange portions that define a retaining channel for receiving and retaining at least a part of an eyeglasses frame. For example, a retaining clip 210 may include an arcuate flange and/or a retaining lip defining a channel for releasably retaining part of an upper frame and/or lenses of a wearer's eyeglasses. As a result, when the HMD is in use, the auxiliary device 200 may provide a mechanism for fixedly securing the HMD to a wearer's eyeglasses.

The relative positioning of the retaining clips 210 may be adjustable. For example, in some embodiments, at least one of the retaining clips 210 may be rotatable about an axis that is generally perpendicular to the first side 211 of the base plate 202. In particular, one or more of the retaining clips 210 may be rotatably attached to the base plate 202. This relative adjustability of the retaining clips 210 may make the auxiliary device 200 suitable for use with different types and sizes of eyeglasses/spectacles.

The auxiliary device 200 may also include a pair of nose pad arms and a lens holder frame which are similar to the nose pad arms 120 and lens holder frame 130 of FIG. 1A. The auxiliary device 200 may include one or more of the nose pad arms 120, lens holder frame 130, and retaining clips 210. In particular, in some embodiments, the nose pad arms, lens holder frame, and retaining clips may be interchangeable components of the auxiliary device 200. For example, the lens holder frame 130 of FIG. 1A or 1B may be substituted for the pair of retaining clips 210, or vice versa. In at least some embodiments, only the retaining clips 210, and not the nose pads arms or the lens holder frames, are coupled to the base plate of the auxiliary device 200.

Figure 3:
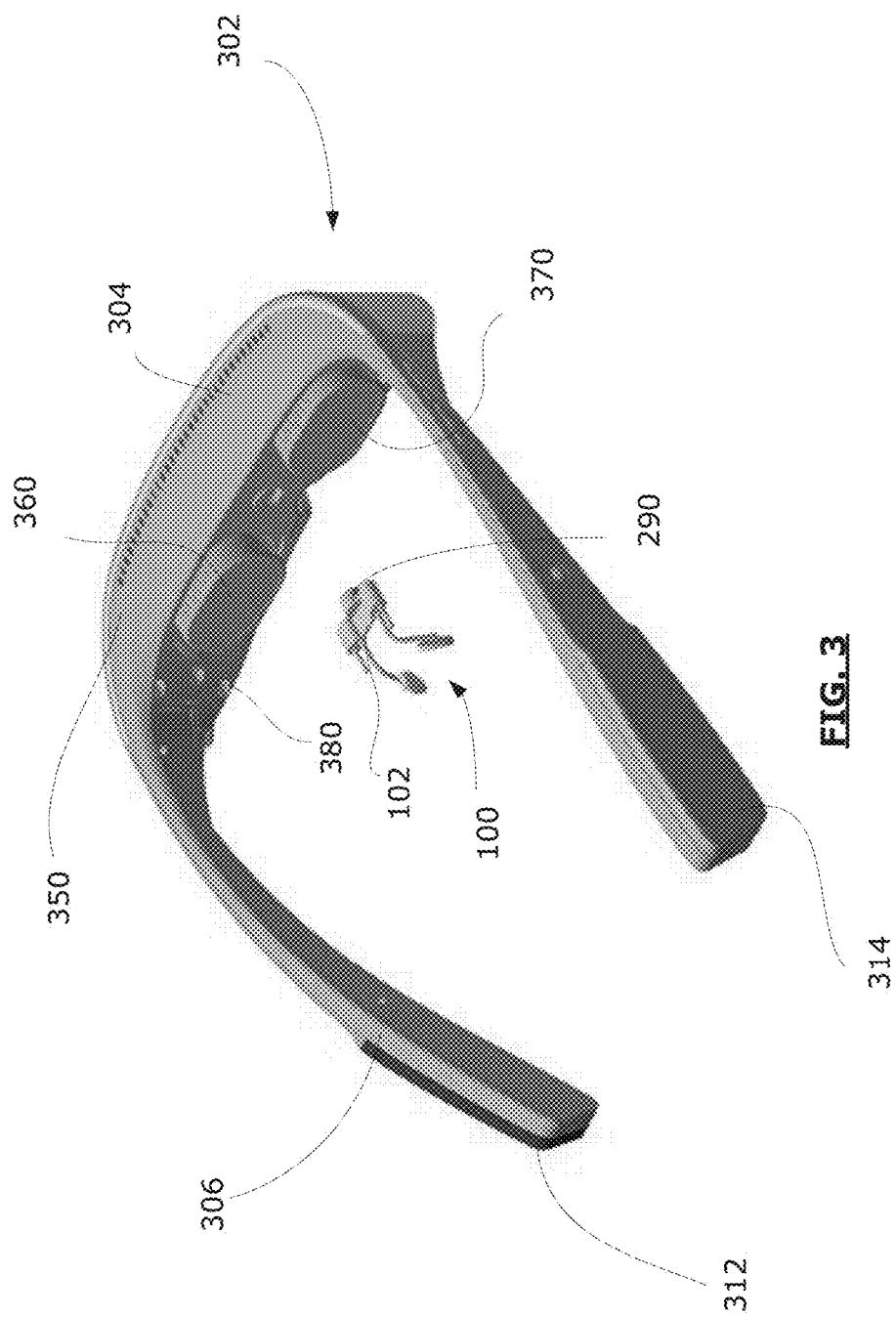
FIG. 3 is a perspective view of an example auxiliary device coupled to a head-mounted display, in accordance with example embodiments of the present disclosure.

Reference is now made to FIG. 3, which is perspective view of the auxiliary device 100 of FIG. 1A coupled to a head-mounted display (HMD) 302. The HMD 302 is configured to be worn on a user's head and includes at least one display optic which is viewable by the user when the HMD 302 is worn. The display optic associated with the HMD 302 may provide displays of electronically generated images and/or videos for viewing by a user of the HMD 302. In at least some embodiments, the HMD 302 may implement an augmented vision system for use by visually impaired persons. The HMD 302 may adapt various image enhancement techniques to generate augmented images of real world environments which can be seen by persons with low vision. In particular, the HMD 302 may be configured to process images of a user's surroundings in real-time and apply digital enhancements to the images which are appropriate for the particular visual impairments experienced by the user.

In some embodiments, the HMD 302 may be an optical head-mounted display (OMHD). That is, the HMD 302 may reflect projected images while also allowing a user to see through the display. For example, various notifications, text, and images may be superimposed on a real world view using the HMD 302. As a result, the HMD 302 may be suitable for providing, for example, immersive and/or mobile augmented reality.

The HMD 302 includes a housing 350 which houses components of the HMD 302. The housing 350 is configured to be worn on a user's head. In particular, at least a portion of the housing 350 may be shaped to generally conform to the contour of a user's face, allowing the housing 350 to be comfortably secured to the user's head when the HMD 302 is in use. The housing 350 includes a front-facing panel 304 and a support frame 306. The front-facing panel 304 may be coupled to the support frame 306 to form the front surface of the HMD 302. When the HMD 302 is worn on a user's head, the front-facing panel 304 may be positioned in front of the user's face such that it substantially covers the user's eyes. In the example of FIG. 3, the front-facing panel 304 is shaped as a curved surface which generally follows the contour of a user's face. In some other embodiments, the front-facing panel 304 may have a planar or substantially planar surface. The front-facing panel 304 may comprise a single cover body or it may be formed from multiple pieces that are combined and held together by support frame 306. For example, the front-facing panel 304 may include a separate cover portion for each of left and right eyes of a user, such that the cover portions align with each respective eye and are held in laterally spaced relation to each other by the support frame 306.

In at least some embodiments, the front-facing panel 304 may be translucent or completely opaque. The interior surface 380 of the front-facing panel 304 may be colored a dark color to provide viewing contrast with respect to display units mounted in the HMD 302. For example, the interior surface 380 of the front-facing panel 304 may be colored black to contrast with the portions of display screens disposed on an interior surface 380 of the HMD 302 which are viewable by a user of the HMD 302. The front-facing panel 304 may be formed from relatively light and rigid material including, for example, glass, plastic, ceramic, or metal.

The support frame 306 forms a support structure for the HMD 302. In at least some embodiments, the support frame 306 comprises sidewalls which support and maintain the front-facing panel 304 in spaced relation to a user's face when the HMD 302 is worn by the user. For example, as shown in FIG. 3, the support frame 306 may include a left frame member 312 and a right frame member 314 which extend rearwardly from the front-facing panel 304. The left and right frame members 312 and 314 are generally perpendicular to a plane defined by the front-facing panel 304 and support the left and right sides of the front-facing panel 304, respectively. In particular, the left and right frame members 312 and 314 may be in parallel spaced relation to each other.

As a further example, the support frame 306 may be a spacer which extends from the front-facing panel 304. A spacer may comprise a substantially continuous sidewall that extends away from the front-facing panel 304. The spacer may define an inner cavity configured to hold, for example, display units of the HMD 302. The spacer may be shaped to accommodate the contour of a user's face. In particular, when the HMD 302 is worn by a user, the spacer may make contact with the user's face such that the front-facing panel 304 is maintained a fixed distance away from the user's face. In some embodiments, a flexible seal member (e.g. constructed of rubber, foam, etc.) may be attached to a free end of the spacer to form a seal between the spacer and the user's face. For example, the seal member may extend along the perimeter of the free end of the spacer such that it rests against the user's face when the HMD 302 is worn. The seal member may accommodate positioning of the HMD 302 relative to the user's head while also serving to prevent ambient light from entering an interior chamber of the HMD 302 and affecting images displayed by the HMD 302.

The support frame 306 may be integrally formed with the front-facing panel 304 (as in the example of FIG. 3), or it may be separable from the front-facing panel 304. In some embodiments, the front-facing panel 304 may be a separate component that can be secured to the support frame 306 by a suitable attachment mechanism. For example, the front-facing panel 304 and the support frame 306 may include interlocking components which allow left and right frame members to engage and be secured to the front-facing panel 304.

The HMD 302 includes a first display 360 and a second display 370 that are disposed in spaced relation to each other on the interior surface 380 of the front-facing panel 304. The first display 360 and second display 370 are positioned on the interior surface 380 to respectively cover a user's left and right eyes when the HMD 302 is worn by the user. The display units 360 and 370 will be described in greater detail below with respect to FIG. 4.

The auxiliary device 100 of FIGS. 1A and 1B, and/or the auxiliary device 200 of FIG. 2 are configured to be attached to the HMD 302. In particular, the base plate 102 of the auxiliary device 100 is configured to be detachably affixed to the interior surface 380 of the front-facing panel 304 at a position that is between the first display 360 and the second display 370. For example, the base plate 102 may be magnetically coupled to the interior surface 380. As a further example, the auxiliary device 100 may also include an insert 290 extending from the second side 112 of the base plate 102 that facilitates attaching the auxiliary device 100 to the interior surface 380. In particular, a recess (or groove) may be defined on the interior surface 380 and the insert 290 may be sized to be received and retained in the recess. In at least some embodiments, as in the example of FIG. 3, the insert 290 may be generally cylindrical, having a height (i.e. the distance that the insert 290 extends from the base plate 102) that corresponds to a depth of a recess or bore defined on the interior surface 380. The insert 290 may have a sufficiently large height to ensure that the insert 290 remains secured in the recess on the interior surface 380. For example, the height of the insert 290 may, in some embodiments, be greater than 5 millimeters. In particular, the insert 290 may be sized to frictionally fit in a recess or bore defined on the interior surface 380.

Alternatively, in some embodiments, the base plate 102 may define a recess on the second side 112 and a male connecting means (such as an insert) may extend from the interior surface 380. More generally, a male coupling member on one of the second side 112 and the interior surface 380 may matingly engage with a female coupling member on the other of the second side 112 and the interior surface 380 for a frictional fit, such that the base plate 102 is attached in fixed relative position to the HMD 302.

The lens holder frame 130 of the auxiliary device 100 is configured to hold a pair of prescription lenses in spaced relation to the base plate 102 such that the lenses are aligned with the display units of the HMD 302. More specifically, the lens holder frame 130 holds a first prescription lens and a second prescription lens such that the first prescription lens and the second prescription lens are generally aligned with the first display 360 and second display 370, respectively, when the base plate 102 is affixed to the interior surface 380.

While FIG. 3 illustrates only the auxiliary device 100 of FIG. 1A, each of the auxiliary device 100 of FIG. 1B and auxiliary device 200 of FIG. 2 may be configured for fixed attachment to the HMD 302 by using similar mechanisms as those described above. In particular, the HMD 302 is configured to be worn by different users having different vision needs and requirements, by switching between the embodiments of the auxiliary device illustrated in FIGS. 1A, 1B and 2.

Figure 4:
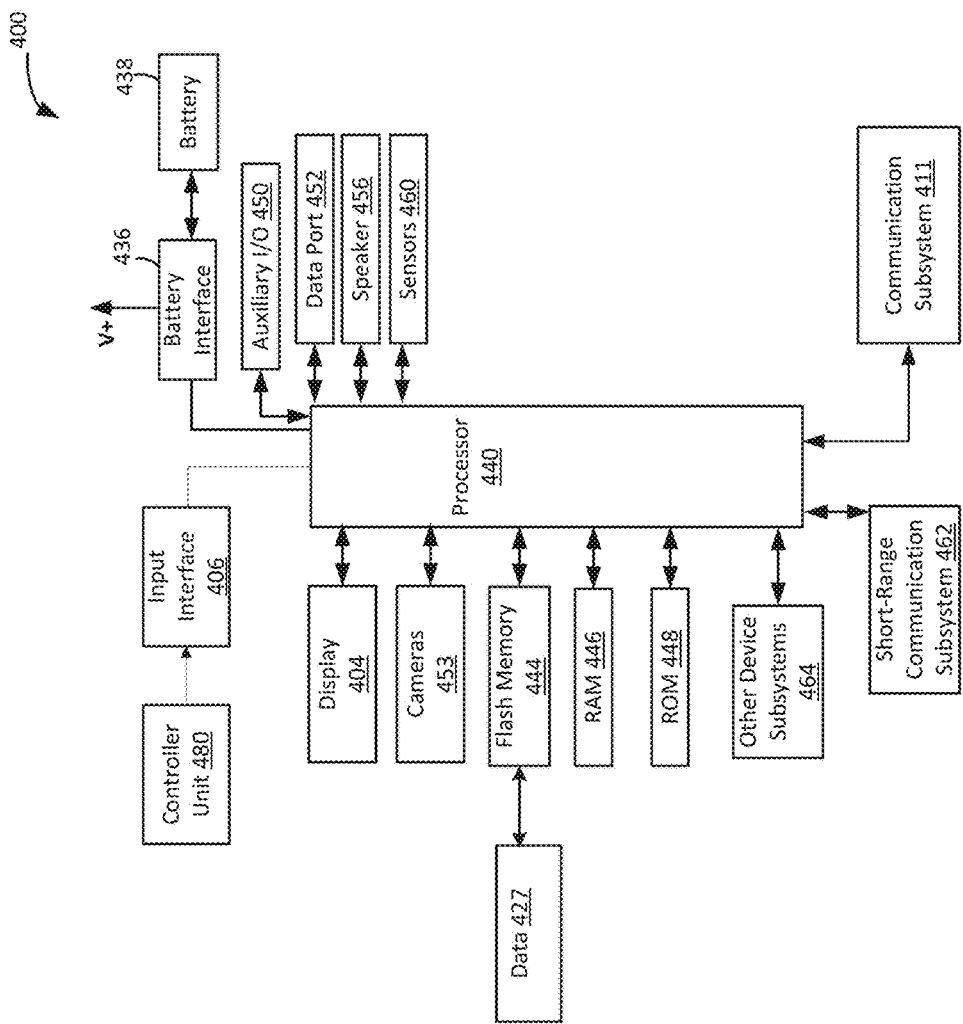
FIG. 4 is a block diagram illustrating components of a head-mounted display in accordance with an example embodiment of the present disclosure.

Reference is now made to FIG. 4, which shows a block diagram illustrating components of a head-mounted display (HMD) 400 in accordance with example embodiments of the present disclosure. Internal components of the HMD 400 may be constructed on a printed circuit board (PCB). The HMD 400 includes a controller including at least one processor 440 (such as a microprocessor) which controls the overall operation of the HMD 400. The processor 440 interacts with device subsystems such as a wireless communication subsystem 411 for exchanging radio frequency signals with an external wireless network to perform communication functions. The processor 440 interacts with additional device subsystems including one or more input interfaces 406, flash memory 444, random access memory (RAM) 446, read only memory (ROM) 448, auxiliary input/output (I/O) subsystems 450, a data port 452 (which may be a serial data port, such as a Universal Serial Bus (USB) data port), one or more output interfaces (such as display units 404, which may be liquid crystal displays (LCD), one or more speakers 456, or other output interfaces), a short range communication module 462, and other device subsystems generally designated as 464. Some of the subsystems shown in FIG. 4 perform communication-related functions, whereas other subsystems may provide "resident" or on-device functions.

The HMD 400 includes one or more display units 404. The display units 404 display images for viewing by a user of the HMD 400. The display units 404 are mounted on an interior surface of a front-facing panel of the housing of the HMD 400 and are directly viewable when the HMD 400 is worn by a user. In particular, the display units 404 are positioned within the housing such that the display units 404 are disposed directly in front of the user's eyes when the HMD 400 is suitably mounted on the user's head during use. Two separate display screens are provided, with a display screen disposed in front of each of a user's left and right eyes. For example, two display screens 404 may be mounted on an interior surface of the front-facing panel of the HMD and positioned in laterally spaced relation to each other such that the centers of the display screens 404 are separated by an appropriate distance (e.g. mean inter-pupillary distance, ranging from approximately 58 millimeters to 70 millimeters). The display screens may use any one of Organic Light Emitting Diode (OLED), Liquid Crystal on Silicon (LCS), virtual retinal display (VRD), or Liquid Crystal Display (LCD) technologies. The display screens may comprise arrays of a plurality of curved mirrors.

The processor 440 interacts with the display units 404 and is configured to transmit data for display by the display units 404. In particular, the processor 440 may transmit image and/or video data to the display units 404 for display to a user of the HMD 400. For example, the processor 440 may generate and provide separate images for each of the display screens. The images provided to the respective display screens may comprise left and right eye views of a user's real world environment, seen using the HMD 400.

The communication subsystem 411 includes a receiver, a transmitter, and associated components, such as one or more antenna elements, local oscillators, and a processing module such as a digital signal processor (DSP). The antenna elements and may be embedded or internal to the HMD 400 and a single antenna may be shared by both receiver and transmitter. The particular design of the wireless communication subsystem 411 depends on the external wireless network in which the HMD may be configured to operate.

In some embodiments, the auxiliary I/O subsystems 450 may include an external communication link or interface such as, for example, an Ethernet connection. The HMD 400 may include other wireless communication interfaces for communicating with other types of wireless networks; for example, a wireless network such as an orthogonal frequency division multiplexed (OFDM) network.

The HMD 400 may store data 427 in an erasable persistent memory which, in one example embodiment, is the flash memory 444. The data 427 may include user profile information and user preferences with respect to image display settings, such as magnification level and image enhancement and control modes (e.g. brightness, contrast, etc.). The data 427 may, in some embodiments, include metadata storing information about images generated and/or displayed using the HMD 400. The metadata and the images may be stored together or separately. The data 427 may also include such information as device identification data, usage history, and profiles of connected devices.

The data port 452 may be used for synchronizing the HMD 400 with one or more external computer systems. The data port 452 enables a user to set preferences through an external device or software application and extends the capabilities of the HMD 400 by providing for information or software downloads to the HMD 400 other than through an external wireless network. For example, the processor 440 of the HMD 400 may receive image and/or video data for display on the display units 404 via wired USB connections to external devices, such as a computer or camera. In at least some embodiments, the HMD 400 may be synchronized wirelessly with external systems and devices, for example, via the communication subsystem 411 and/or the short range communication module 462.

The HMD 400 includes a battery 438 as a power source, which is typically one or more rechargeable batteries that may be charged, for example, through charging circuitry coupled to a battery interface 436. The battery 438 provides electrical power to at least some of the electrical circuitry in the HMD 400, and the battery interface 436 provides a mechanical and electrical connection for the battery 438. The battery interface 436 is coupled to a regulator (not shown) which provides power V+ to the circuitry of the HMD 400.

The short range communication module 462 provides for communication between the HMD 400 and different systems or devices. For example, the short range communication module 462 may include an infrared device and associated circuits and components, or a wireless bus protocol compliant communication mechanism such as a Bluetooth® communication module to provide for communication with similarly-enabled systems and devices.

The HMD 400 may include one or more cameras 453. A camera 453 is capable of acquiring camera data such as images in the form of still photographs and/or motion video. The camera data may be captured in the form of an electronic signal which is produced by an image sensor. In at least some embodiments, the HMD 400 includes two cameras 453 configured to capture left and right viewpoint images of a real world scene. That is, a first camera of the HMD 400 may capture an image corresponding to a left eye view of a scene and a second camera of the HMD 400 may capture an image corresponding to a right eye view of the same scene. As a result, the cameras 453 may provide suitable images for generating binocular views of a scene. In some other embodiments, the HMD 400 may include a single camera 453. For example, a camera 453 that is centrally disposed in the HMD 400 may be configured to capture images which may be displayed as single images or which may be digitally modified to generate two different images (i.e. left and right images) for presentation to the respective eyes of a user. The captured images may also be modified non-digitally; for example, a camera view may be split into a left and right view using various arrangements of mirrors and/or prisms.

The cameras 453 are mounted in the housing and are front-facing. That is, the cameras 453 are mounted in such a manner that, when the HMD 400 is worn by the user, the cameras 453 are directed to scenes in front of the user. In at least some embodiments, the cameras 453 may be integrated into the front-facing panel. For example, the front-facing panel may be at least partially translucent and allow sufficient light to enter image sensors associated with cameras 453 positioned inside the front-facing panel. As another example, the cameras 453 may be embedded into the front-facing panel such that the lens covering the image sensors of the cameras 453 are substantially flush with an outer surface of the front-facing panel. The cameras 453 may alternatively be mounted directly on the outer surface of the front-facing panel.

In some embodiments, each camera 453 may be coupled to an actuator or motor for electrically displacing the camera 453 with respect to the housing. The actuator or motor may be controlled by signals provided by control circuitry of the HMD 400 or a remote control circuitry (e.g. an external device that is connected to the HMD 400). A user of the HMD 400 may manually control an actuator/motor to change the relative position or line of sight of an associated camera, or the actuator/motor may be engaged automatically in response to predetermined triggers (e.g. detection of eye movement via gaze tracking).

The cameras 453 may be coupled directly with the processor 440 which controls the cameras. In some embodiments, the cameras 453 may include dedicated image signal processors which may provide at least some camera-related functions. For example, an image signal processor of camera 453 may be configured to provide, among others, auto-focusing, sensitivity and brightness control, or magnification functions. Various functions and features of a dedicated camera application or software module may, in some embodiments, be provided, in whole or in part, by an image signal processor.

The HMD 400 may also include one or more on-board sensors 460. For example, the HMD 400 may include a gyroscope and/or an accelerometer. The HMD 400 may also include eye- or gaze-tracking sensors/cameras for measuring the motion of eyes relative to a user's head and the direction or point of gaze. For example, one or more infrared-sensitive cameras may be mounted in the interior of the housing to track movement of a user's eyes based on known techniques, such as corneal-reflection-based eye tracking. In at least some embodiments, the HMD 400 includes a thermometer and/or a hygrometer inside the housing. That is, sensors may be provided in the HMD 400 for measuring the temperature or moisture content in the interior space of the housing of the HMD 400.

In at least some embodiments, the processor 440 and associated electronics of one or more device subsystems of the HMD 400 may be integrated into the front-facing panel and/or support frame of housing. In particular, the on-board processor 440 may perform various tasks, such as image enhancement, data processing, etc., and execute the software modules stored in memory of the HMD 400, without relying on additional processing capacity from external systems or devices.

The input interface 406 may include a controller unit 480. In some embodiments, the controller unit 480 may comprise a physical interface, such as a panel or touchscreen, which is directly coupled to the housing. For example, the controller unit 480 may be a panel containing a plurality of depressible buttons that correspond to various functionalities which can be implemented by the HMD 400. As another example, the controller unit 480 may comprise a touch-sensitive overlay (i.e. a touch-sensitive input surface overlaying a display). The processor 440 interacts with the controller unit 480 to receive instructions manually input by a user of the HMD 400 using the controller unit 480. In at least some embodiments, the controller unit 480 can be used to control the display of information on the display unit 404. For example, the controller unit 480 may be used to navigate a graphical menu that is displayed on the display unit 404. As another example, the controller unit 480 can be used to move a displayed cursor or any other indicator user interface element for selecting and highlighting various regions of displayed images on the display unit 204.

In some embodiments, a user can indicate settings or parameters to apply to images that are displayed by the HMD 400 using the controller unit 480. For example, the controller unit 480 may provide options to select one or more image enhancements to apply to images that are captured by cameras 453 of HMD 400. The image processing options for the HMD 400 may include, among others, image magnification/minification, brightness adjustment, contrast reversal, color changes, edge enhancement, image remapping, and text extraction.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. An auxiliary device configured to be attached to a head-mounted display (HMD), the HMD including a housing having at least a front-facing panel, a first display, and a second display, the first and second displays being disposed in spaced relation to each other on an interior surface of the front-facing panel and positioned to respectively cover a user's left and right eyes when the HMD is worn by the user, the auxiliary device comprising:
 a base plate configured to be detachably affixed to the interior surface of the front-facing panel at a position that is between the first display and the second display; and
 a pair of retaining clips extending from a first side of the base plate, the retaining clips extending laterally in opposite directions, each retaining clip including an arm having a first sub-arm that extends perpendicularly away from the first side at a position on the base plate that is proximal to a first end of the base plate, a second sub-arm that is substantially perpendicular to the first sub-arm and extends laterally away from a second opposite end of the base plate, wherein each arm has an arcuate flange defining a retaining channel for receiving and releasably retaining at least a portion of an eyeglasses frame.

2. The auxiliary device of claim 1, wherein at least one of the retaining clips comprises a spring clip.

3. The auxiliary device of claim 1, wherein at least one of the retaining clips is rotatable about an axis that is generally perpendicular to the interior surface of the front-facing panel.

4. The auxiliary device of claim 1, wherein the base plate is magnetically coupled to the interior surface of the front-facing panel.

5. The auxiliary device of claim 1, further comprising an insert extending from a second side of the base plate, the second side being opposite the first side, wherein the insert is sized to be received and retained in a recess defined on the interior surface of the front-facing panel.

6. A head-mounted display (HMD), comprising:
 a housing including:
  a front-facing panel;
  a first display and a second display, the first and second displays being disposed in spaced relation to each other on an interior surface of the front-facing panel and positioned to respectively cover a user's left and right eyes when the HMD is worn by the user, and
 an auxiliary device coupled to the housing, the auxiliary device including:
  a base plate configured to be affixed to the interior surface of the front-facing panel at a position that is between the first display and the second display; and
  a pair of retaining clips extending from a first side of the base plate, the retaining clips extending laterally in opposite directions, each retaining clip including an arm having a first sub-arm that extends perpendicularly away from the first side at a position on the base plate that is proximal to a first one-end of the base plate, a second sub-arm that is substantially perpendicular to the first sub-arm and extends laterally away from a second opposite the other-end of the base plate, wherein each arm has an arcuate flange defining a retaining channel for receiving and releasably retaining at least a portion of an eyeglasses frame.

7. The HMD of claim 6, wherein at least one of the retaining clips comprises a spring clip.

8. The HMD of claim 6, wherein at least one of the retaining clips is rotatable about an axis that is generally perpendicular to the interior surface of the front-facing panel.

9. The HMD of claim 6, wherein the base plate is magnetically coupled to the interior surface of the front-facing panel.

10. The HMD of claim 6, wherein the auxiliary device includes an insert extending from a second side of the base plate, the second side being opposite the first side, wherein the insert is sized to be received and retained in a recess defined on the interior surface of the front-facing panel.

11. The HMD of claim 6, further comprising:
 at least one camera coupled to the housing; and
 a processor coupled to the at least one camera, the first display, and the second display, the processor being configured to process one or more images captured by the at least one camera and present the processed images for display on the first and second displays.

* * * * *